July 21, 1931.    H. E. MARSH    1,815,158
MECHANISM FOR ACTUATING WINDSHIELD WIPERS AND THE LIKE
Filed Sept. 1, 1928
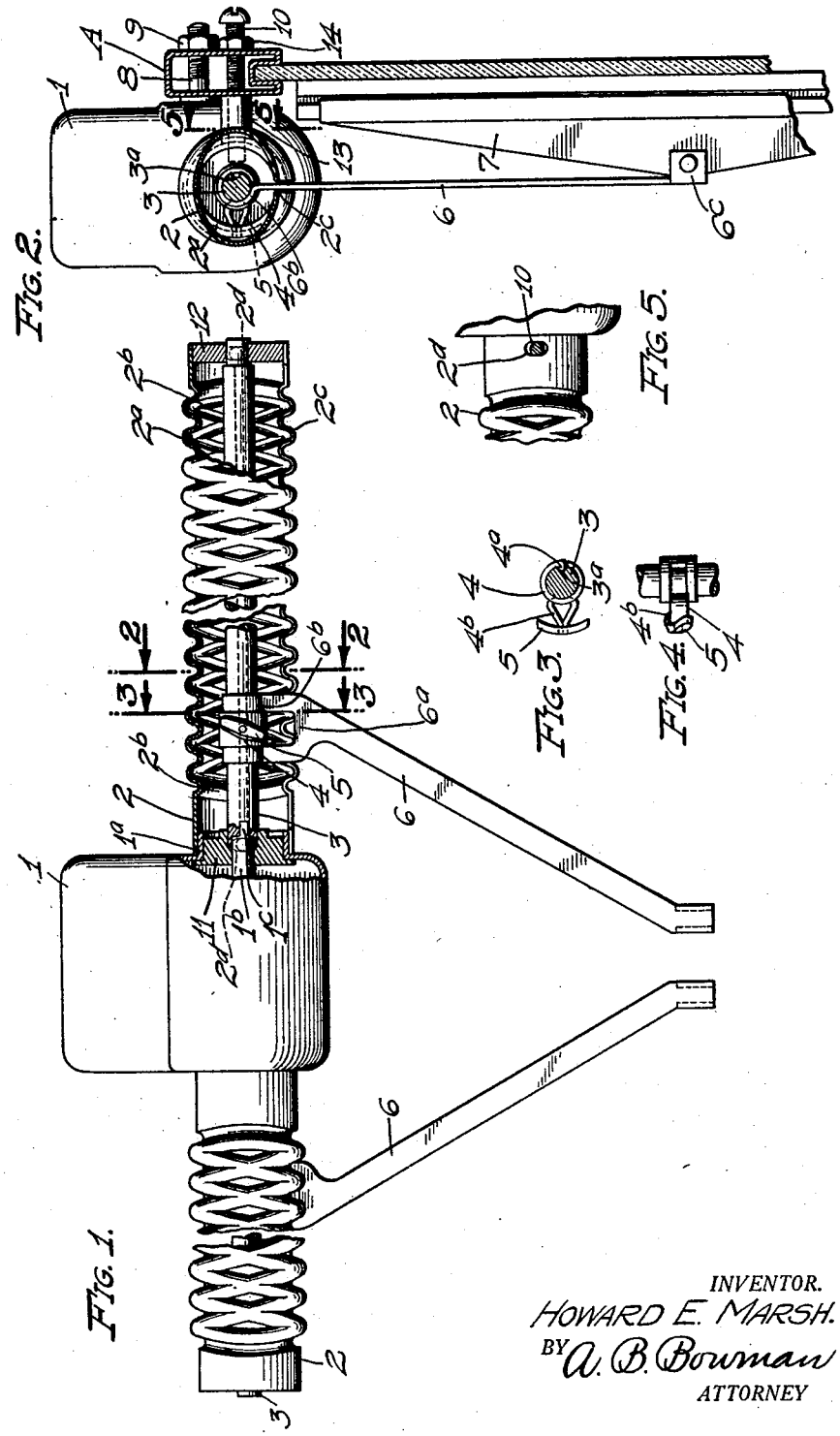
INVENTOR.
HOWARD E. MARSH.
BY A. B. Bowman
ATTORNEY Patented July 21, 1931

1,815,158

UNITED STATES PATENT OFFICE

HOWARD E. MARSH, OF LOMPOC, CALIFORNIA

MECHANISM FOR ACTUATING WINDSHIELD WIPERS AND THE LIKE

Application filed September 1, 1928. Serial No. 303,538.

My invention relates to windshield wipers, and particularly to mechanisms for operating the same and similar devices requiring continuous reciprocating motion.

The objects of my invention are: first, to provide a mechanism of this class which is substantially wholly enclosed, thereby protecting the same against weather, dirt, and grit, and for providing efficient lubrication thereof and for preventing lubricating oil from flying outwardly; second, to provide a mechanism of this class in which the operative reciprocating elements are enclosed within a tube having internal threads or helical guide means for reciprocating a slide, said guide means providing large and extended bearing surfaces for the reciprocating slide or the shoe carried thereby; third, to provide a mechanism of this class having a reciprocating slide or arm which may be easily adjusted about its supported end by slightly rotating or adjusting the tube carrying the helical guide means; fourth, to provide a mechanism of this class in which the reciprocating means is wholly enclosed and the windshield-wiper or other carrying slide or arm extends through a slot in one side of the enclosure for the reciprocating means; fifth, to provide a novelly and economically constructed tube for enclosing the reciprocating means and for forming the helical guide means for actuating the reciprocating means; sixth, to provide a mechanism of this class having such reciprocating arms and reciprocating means at its opposite sides whereby the arms or slides are reciprocated in opposite directions relative to each other thereby reducing the strains on the mechanism to a minimum; seventh, to provide as a whole a novelly constructed mechanism of this class; and, eight, to provide a mechanism of this class which is economical of construction proportionate to its functions, durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a fragmentary front elevational view of my windshield wiper and operating mechanism, showing certain parts and portions thereof broken away and in section to facilitate the illustration; Fig. 2 is a sectional elevational view thereof taken through 2—2 of Fig. 1, showing the method of mounting the same on a windshield; Fig. 3 is a fragmentary sectional view thereof taken through 3—3 of Fig. 1; Fig. 4 is a fragmentary side view of the portion shown in Fig. 3; and, Fig. 5 is a fragmentary sectional elevational view of my mechanism taken through 5—5 of Fig. 2, showing the relation of elements for adjusting the reciprocating arms and the windshield wiping elements relative to the windshield.

Like characters of reference refer to similar parts and portions throughout the views of the drawings.

My mechanism, as applied to a windshield wiper consists essentially of a motor 1, a pair of enclosing tubes mounted at one end on bosses 1a of the motor frame and extending to the opposite sides thereof concentrically with respect to the shaft 1b of the motor, spindles 3 mounted concentrically within the tubes 2 and connected to the motor shaft 1b, slides 4 reciprocally mounted on the spindles 3, and revoluble therewith, shoes 5 mounted on the slides 4 and engaging guide means on the interior of the tubes 2, arms 6 mounted on the spindles 3 in cooperative relation with the slides 4, and windshield wiping elements 7 secured to the extended ends of the arms 6.

The motor 1 is preferably an electric motor and in the embodiment of my invention, as specifically shown in the drawings, is mounted intermediate the ends and on the upper rail A of an automobile windshield, or the same may be mounted on any other frame member above the glass of the windshield. The securing means for the motor may consist of bolts or studs 8 extending from the motor housing through the frame A and secured in position by nuts 9.

The inner ends of the tubes 2 are secured to the bosses 1a of the motor housing by screws 10 which will be more specifically described hereafter. The outer or extended ends of the tubes 2 are preferably also secured to the frame A by other screws 10, as will be more specifically described hereafter. The tubes 2 are provided in their inner walls with threads or helical channels 2a which form guide means for the shoes 5. There are at least two of such helical channels in each tube, the channels being of opposite hand or angularity, or threads of opposite hand. These threads or channels are connected at their coincident ends by rounded or gradually curved portions 2b whereby the shoe, when carried along by one of the threads or channels to the end thereof, is automatically diverted or directed into the other thread or channel and thus carried continuously from end to end as the shoe 5 is rotated.

The tubes 2 are preferably made of plain sheet metal with the ridges and grooves, forming the threads 2a, at an angle therein and with each of the threads at opposite angle. The sheet of metal thus formed is formed into a tube with the seam at one side. The opposite ends of the tubes are preferably connected while the portions intermediate the ends are spaced apart forming a longitudinal slot 2c intermediate the ends.

With the boss 1a of the motor housing is mounted a journal or head member 11 which may be secured in position by the screw 10. In the journals 11 at the opposite sides of the motor are revolubly mounted the ends of the motor shaft 1b. The spindle 3, as shown, is a round spindle and is non-rotatably but removably connected to the end of the motor shaft by a tongue 1c in the latter which tongue extends into a transverse slot at the inner end of the spindle 3. The opposite end of the spindle in each tube 2 is revolubly mounted at its outer reduced end on a journal or head 12 which is secured to the outer end of the tube 2 by means of the screw 10 securing the free end of the tube to the frame A.

The slide 4 consists of a ring made of a strap bent in circular form, the one end having an inwardly turned lug 4a which extends into a keyway 3a extending longitudinally with and substantially over the whole of the length of the spindle. Thus the slide 4 is prevented from rotating relative to the spindle. Opposite the key portion of the ring is provided a supporting or pivotal portion 4b which is preferably formed by stamping out tongues from the opposite sides of the member 4 and folding the same together at their ends, substantially as shown in Fig. 3. The ends of said tongues are machined together to form a pivotal portion for the shoe 5. This shoe 5 is arcuate in form and tapered toward its end so as to follow conveniently the channels on the inside of the tubes and to pass through the gaps formed by the crossing of the threads or channels 2a.

Each of the arms 6 extends into one of the tubes 2 through the longitudinal slots therein and is provided at the end within the tube with a bifurcated portion 6a which is adapted to straddle the slide 4 and is provided at the ends of the furcations with loops 6b which extend around the spindle 3. Thus, as the slide 4 is moved back and forth on and with the spindle 3, the arm 6 is also moved back and forth but prevented from rotating by the extension of the arm through the slot 2c. The two arms 6 extend angularly toward each other so that the windshield wiping elements 7 secured thereto come as close as possible to each other at the central portion of the windshield so as to clean substantially the whole of at least the central portion thereof and considerable distance to either side of the center. The ends of the arms 6 are preferably provided with inwardly extending ears 6c to which the wiping elements 7 are pivotally connected, the pivotal connection permitting the wiping element, which may be of any suitable construction, to engage the glass plate flatly.

In order to shift the arms 6 inwardly toward the windshield, or in any other direction about the pivotal axis of the spindle 3, the tubes 2 which guide the arms in their reciprocal motion are rotated about their mountings. For this purpose, I have provided arcuate slots 2d at the ends of the tubes 2 through which the screws 10 extend. When the tubes 2 are rotated to the desired extent, the same are secured in position relative to the journals or heads 11 and 12. For this purpose, there may be provided locknuts on the screws 10, or, as shown in the drawings, tubular spacers 13. These spacers 13 space the tubes 2 from the frame A and also permit said journal portions to be drawn toward the frame A and locked in position by the locknut 14.

Though I have shown a particular construction, combination and arrangement of parts and portions, and a particular application of my mechanism to a windshield wiper, I do not wish to be limited to this particular construction, combination and arrangement, nor to the particular application, but desire to include in the scope of my invention, the construction, combination and arrangement substantially as set forth in the appended claims.

Having thus described my invention, what I claim as new and desire to secure by Letters Patent is:

1. In a mechanism of the class described, a tubular member having internal threads, a spindle revolubly mounted therein, a slide non-revolubly mounted on said spindle but shiftable longitudinally thereon, and a shoe mounted on said slide adapted to engage the internal threads of said tube and to be shifted longitudinally with respect to said spindle when the latter is rotated.

2. In a mechanism of the class described, a tubular member having threads at its interior, the ends of the threads of opposite hand being connected at their coincident ends forming a substantially continuous guide means, a spindle revolubly mounted therein, a slide non-revolubly mounted on said spindle but shiftable longitudinally thereon, and a shoe mounted on said slide adapted to engage the internal threads of said tube and to be shifted longitudinally with respect to said spindle when the latter is rotated.

3. In a mechanism of the class described, a tubular member having internal threads and a longitudinal slot in one side, a spindle revolubly mounted therein, a slide non-revolubly mounted on said spindle but shiftable longitudinally thereon, a shoe mounted on said slide adapted to engage the internal threads of said tube and to be shifted longitudinally with respect to said spindle when the latter is rotated, and a second slide mounted on said spindle and extending through said slot and cooperatively connected with the first slide whereby the second slide is shifted longitudinally through said slot.

4. In a mechanism of the class described, a tubular member having threads at its interior, the ends of the threads of opposite hand being connected at their coincident ends forming a substantially continuous guide means, and also provided with a longitudinal slot at one side, a spindle revolubly mounted therein, a slide non-revolubly mounted on said spindle but shiftable longitudinally thereon, a shoe mounted on said slide adapted to engage the internal threads of said tube and to be shifted longitudinally with respect to said spindle when the latter is rotated, and a second slide mounted on said spindle and extending through said slot and cooperatively connected with the first slide whereby the second slide is shifted longitudinally through said slot.

5. In a mechanism of the class described, a tubular member having a pair of helical guide channels in its interior, said channels being of opposite angularity and connected together at their coincident ends forming a continuous guide channel from end to end of the tubular member, said tubular member having a slot in one side extending substantially from end to end, a slide mounted within said tube adapted to be directed from end to end of the tube by said guide channels, means for rotating said slide, and a second slide operatively connected to the first slide and extending through said slot.

6. In a mechanism of the class described, a tubular member having a pair of helical guide channels in its interior, said channels being of opposite angularity and connected together at their coincident ends forming a continuous guide channel from end to end of the tubular member, a slide mounted within said tube adapted to be directed from end to end of the tube by said guide channels, means for rotating said slide, and a second slide operatively connected to the first slide.

7. In a mechanism of the class described, a tube having internal threads, a guide member extending through and concentrically with said tube, and a slide reciprocally mounted on said guide member an provided with an outwardly extending shoe adapted to extend into the thread of the tube, whereby said slide is reciprocated on said guide member when the guide member and the tube are rotated relative to each other.

8. In a mechanism of the class described, a tube provided with internal threads of opposite hand, said threads being connected at their coincident ends forming a continuous guide means from end to end.

9. In a mechanism of the class described, a guide means formed of plain sheet metal with diagonal grooves and ridges, said sheet metal being bent in tubular form and the grooves and ridges substantially connecting at their ends with other grooves and ridges forming helical grooves and ridges on the interior of the guide means.

10. In a mechanism of the class described, a guide means formed of plain sheet metal with two series of diagonal grooves and ridges of opposite angles, said sheet metal being bent in tubular form and the grooves and ridges substantially connecting at their ends with other grooves and ridges forming helical grooves and ridges on the interior of the guide means, the grooves and ridges of opposite angularity being connected at their ends in gradual curves forming continuous guide means within and from end to end of the tube.

11. In a mechanism of the class described, a support, a tube mounted upon said support and adjustable relative thereto about its longitudinal axis, said tube having internal threads and a slot at one side, a slide extending with one end in said tube and with its opposite end through said slot, a shoe in cooperative relation with said slide and adapted to engage said threads, and means for rotating said tube.

12. In a mechanism of the class described, a journal, a spindle revolubly mounted thereon, a tube mounted on said journal around and concentric with said spindle, said tube having internal threads and a slot in one side thereof, a slide mounted on said spindle and extending through the slot in the side of the tube, means cooperating with said slide and mounted on said spindle and engaging the threads of the tube, and means for adjusting said tube circumferentially on said journal.

13. In a mechanism of the class described, a motor having a revoluble shaft, a tube connected with the motor and positioned concentrically with the axis of the shaft, said tube having internal threads and a slot in one side, a slide positioned with one end in said tube and extending with its opposite end through said slot, and means cooperating with said slide, rotated by said shaft and engaging the internal threads of the tube whereby the slide is reciprocated with the rotation of the shaft.

14. In a mechanism of the class described, a central motor having a revoluble shaft, a pair of tubes connected to the opposite sides of the motor in axial alignment with said shaft, each of said tubes having internal threads of opposite hand, the threads in each being connected at their coincident ends forming continuous guide means from end to end of each tube, each of the tubes being provided with longitudinal slots at one side, slides having one end mounted in each of said tubes and extending with their opposite ends therefrom, and means in each of the tubes cooperating with said slides rotated by said shaft and engaging the threads in the respective tubes.

15. In a mechanism of the class described, a central motor having a revoluble shaft, a pair of tubes connected to the opposite sides of the motor in axial alignment with said shaft, each of said tubes having internal threads of opposite hand, the threads in each being connected at their coincident ends forming continuous guide means from end to end of each tube, each of the tubes being provided with longitudinal slots at one side, slides having one end mounted in each of said tubes and extending with their opposite ends therefrom, and means in each of the tubes cooperating with said slides rotated by said shaft, and engaging the threads in the respective tubes, said slides being movable toward and from each other.

16. In a mechanism of the class described, a central motor having rotatable shaft means extending beyond its opposite sides, a pair of tubes connected to the opposite sides of the motor around the shaft means, said tubes having longitudinal slots, and screw means and slides in cooperative relation with each of said tubes and said shaft means whereby said slides in the slots of each of the tubes at the opposite sides of the motor are shifted toward and from each other.

17. In a mechanism of the class described, a central motor having rotatable shaft means extending beyond its opposite sides, a pair of tubes connected to the opposite sides of the motor around the shaft means, said tubes having longitudinal slots, screw means in connection with the tubes, and slides mounted in the tubes and extending through said slots and in cooperative relation with said screw means and shaft means whereby the slides are shifted toward and from each other.

In testimony whereof, I have hereunto set my hand at Los Angeles, California this 21st day of August, 1928.

HOWARD E. MARSH.